Dec. 21, 1965    J. L. SWANSON    3,224,114
ARITHMETIC GAME

Filed July 22, 1963    3 Sheets-Sheet 1

FIG. I

JOSEPH L. SWANSON
*INVENTOR.*

BY

Dec. 21, 1965    J. L. SWANSON    3,224,114
ARITHMETIC GAME
Filed July 22, 1963    3 Sheets-Sheet 2

JOSEPH L. SWANSON
INVENTOR.

BY

Dec. 21, 1965     J. L. SWANSON     3,224,114
ARITHMETIC GAME

Filed July 22, 1963     3 Sheets-Sheet 3

JOSEPH L. SWANSON
*INVENTOR.*

BY

United States Patent Office 3,224,114
Patented Dec. 21, 1965

1

3,224,114
ARITHMETIC GAME
Joseph L. Swanson, 123 32nd St., SE.,
Grand Rapids 8, Mich.
Filed July 22, 1963, Ser. No. 297,439
3 Claims. (Cl. 35—31)

This invention relates to the construction of educational games, and has been developed primarily to drill students in the basic operations of arithmetic. It is generally recognized that the presence of a "game" atmosphere will often provide motivation and pleasantness which stimulate the learning process, particularly in students that find little enjoyment in the learning process per se. The success encountered in the use of this invention may also be due in part to the generation in the student's mind of a visual image representing the several operations. In any event, the eager participation of students in the "playing" of the game has resulted in a much more thorough exposure to arithmetic than would have been practical in normal classroom procedure. In fact, the pleasure aspect of the invention is present in such a degree that the "game" is valuable as an amusement device in the home. Whether this is due to the individual absorption in the processes of the game, or to competitive conditions (that may be established by rules) is hard to say.

In summary, the game device is based upon a "board" or panel having a group of openings arranged in rows and columns, preferably in a square or rectangular pattern. A group of insert pieces is adapted for placement in closely-fitting relationship in the openings, with the openings and the insert pieces having interengageable discontinuities whereby the pieces may be placed in certain openings and none other. The rows and columns are provided with indicia, and a particular opening will represent the intersection of a particular row and a particular column. The interaction of the indicia corresponding to this row and column, according to a stated arithmetic operation, will have the result appearing as indicia on the insert piece. It should be noted that the indicia on the insert piece will often require that this piece be insertable in more than one opening. Thus, in a device adapted for the operation of multiplication, the insert piece carrying the indicia 12 would have to be insertable at the intersection of rows and columns labeled 2 and 6, respectively and also at 3 and 4. Preferably, the device will also be constructed such that the reverse side of the panel and the insert piece will contain indicia representing either the reverse of the mathematical operations on the opposite side, or a continuation of those operations.

The several features of the invention will be discussed in further detail through an analysis of the particular embodiments illustrated in the accompanying drawings. In the drawings.

Figure 1:
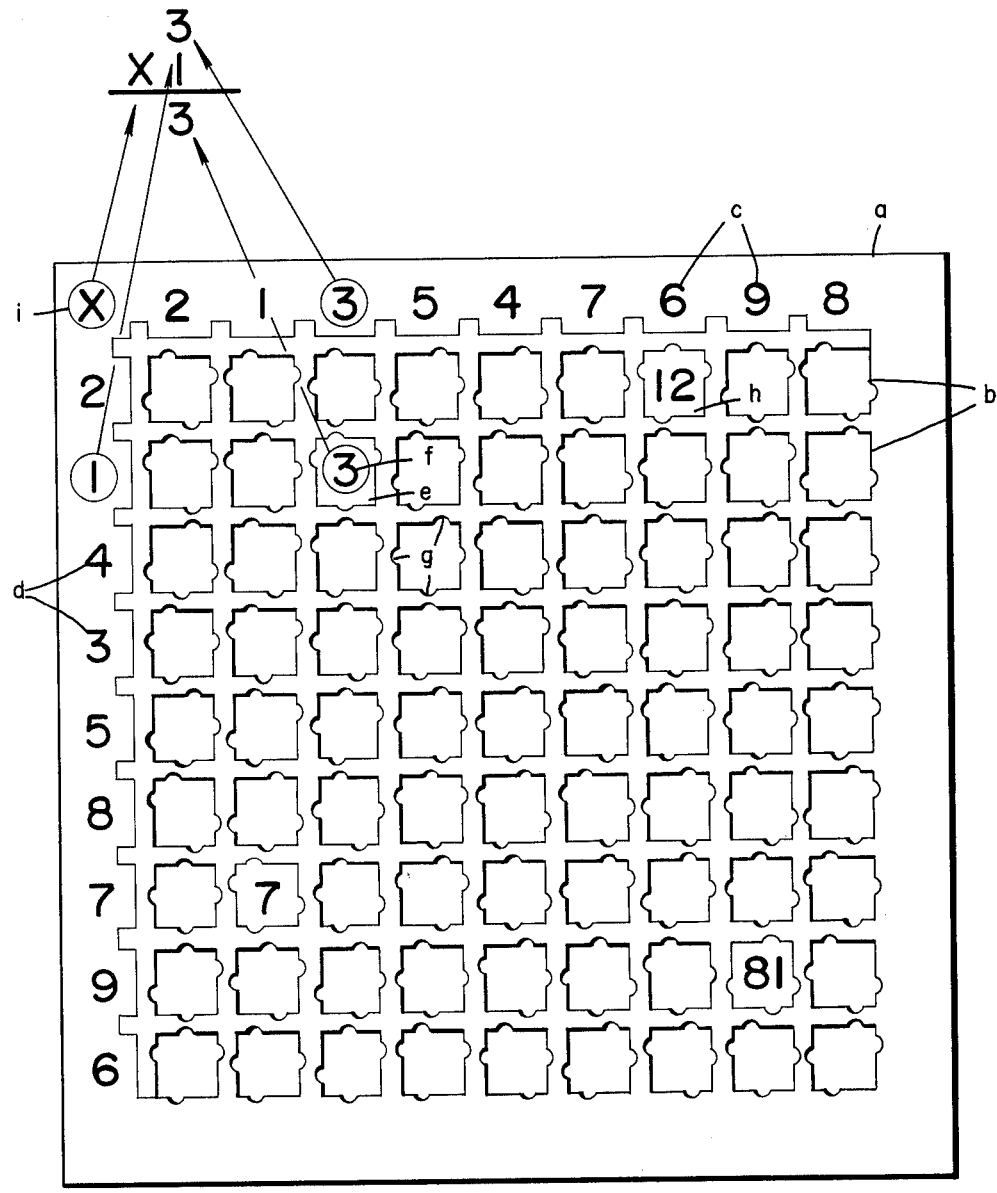
FIGURE 1 illustrates the use of the board in conjunction with the operation of multiplication.

In view of the profusion of numbers associated with the game itself, the various components of the game will be referred to herein by letters. In FIGURE 1, the gameboard includes a panel $a$ having a group of openings $b$ arranged in columns or rows, with the columns carrying the indicia $c$ and the rows the indicia $d$. The insert piece $e$ carries the indicia $f$, and it will be noted that the indicia is the numeral 3, which represents the result of multiplying the column indicia 3 by the row indicia 1. The openings $b$ are provided with discontinuities as shown at $g$, and the insert pieces are provided with corresponding discontinuities which are arranged in such a fashion that the insert pieces are insertable only in openings in which the indicia $f$ represent the result of the operation of multiplication applied to the columns and rows at which the particular opening is the intersection.

Figure 2:
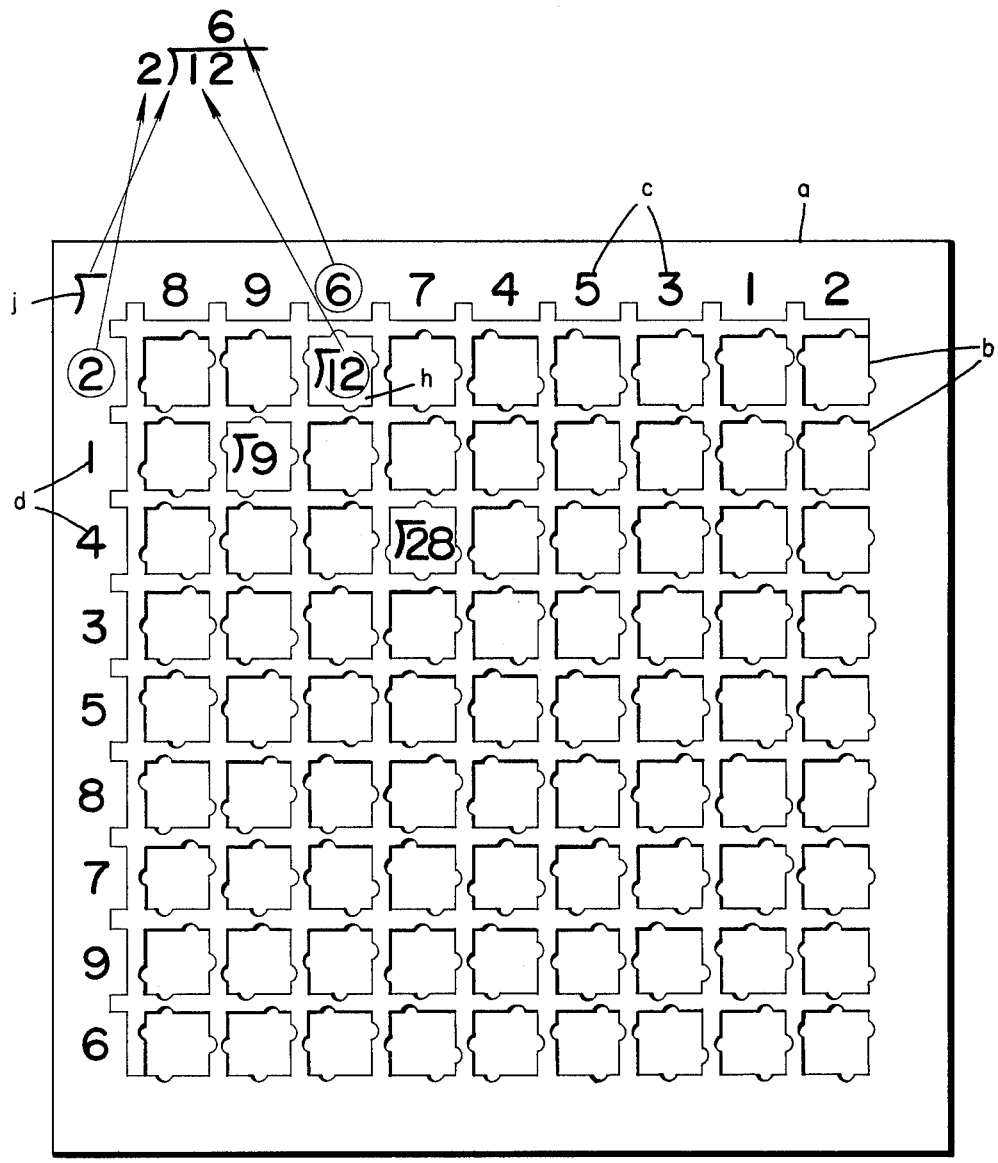
FIGURE 2 illustrates the reverse side of the board shown in FIGURE 1, showing the operation of division.

The reverse side of the board assembly shown in FIGURE 1 carries an arrangement of indicia corresponding to division, which is the opposite of the multiplication operation upon which the FIGURE 1 side of the board is based. The insert piece $h$ appearing in FIGURE 1 as the results of the multiplication of the row 2 times the column 6 will appear on the FIGURE 2 side of the board as the number which, when divided by 2 produces 6. The arrangement shown in FIGURE 2 is the preferred form, and in which the relative placement of the divisor and the dividend correspond to the usual position in which the student is accustomed to making his calculations. It should also be noted that the insert piece $h$ would also be insertable in FIGURE 1 at the intersection of the row 4 and the column 3, and would have the corresponding placement in FIGURE 2. The mark at the upper left corner of FIGURE 1 indicated at $i$ defines the arithmetic operation upon which that side of the board is based. In FIGURE 1 the insignia appears as a multiplication sign; and in FIGURE 2 the indicia $j$ indicates the process of division.

Figure 3:
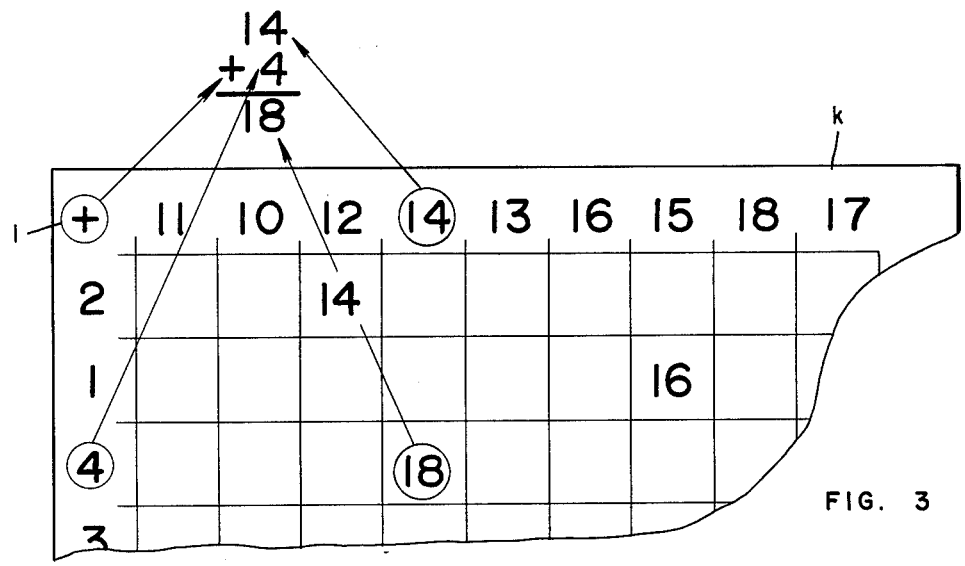
FIGURE 3 illustrates the arrangement of a board for use with addition.
Figure 4:
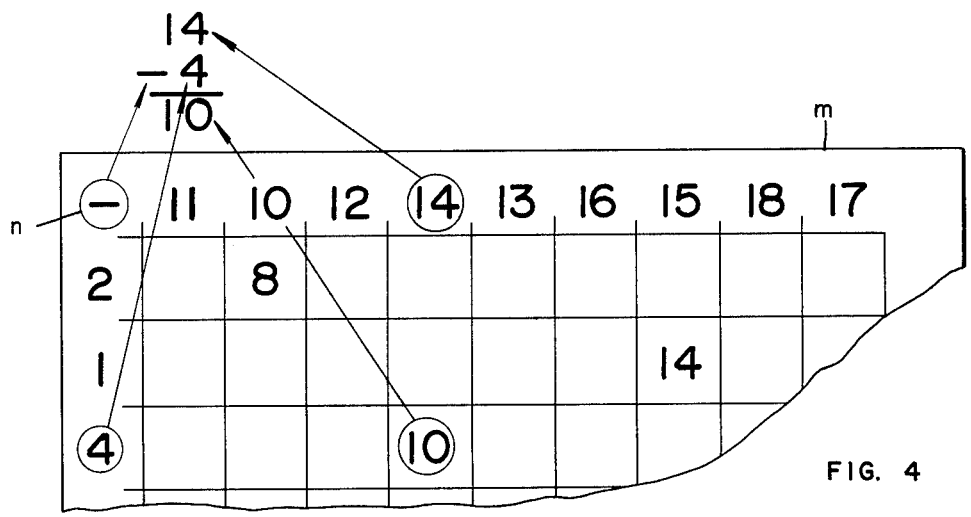
FIGURE 4 illustrates the use of a board arranged for subtraction.
Figure 5:
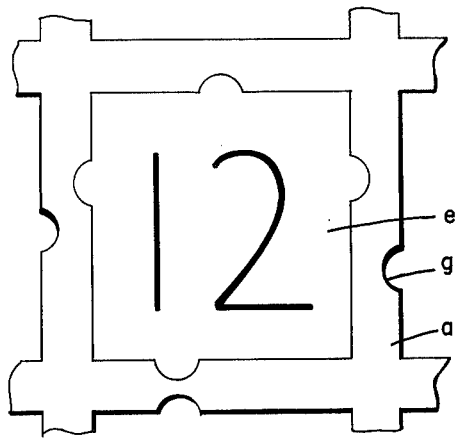
FIGURE 5 represents an enlarged view showing a typical relationship of an insert with one of the openings on the panel.

Referring to FIGURE 3, the panel $k$ is arranged with indicia corresponding to the process of addition, which is indicated by the mark shown at $l$. FIGURES 3 and 4 are diagrammatic in character, and do not illustrate the interengaging discontinuities in the insert pieces and the openings which restrict the insertion to particular locations where the corresponding indicia represent correct procedures. In FIGURE 4, the panel $m$ is equipped with an arrangement of indicia corresponding to the subtraction sign shown at $n$. The opposite sides of these boards may reflect continuations of indicia from one side to the other, rather than reversed operations. For example, an addition board might show column indicia from one to nine on one side, and from ten to eighteen on the other. Corresponding indicia would appear in the rows and insert pieces.

In the "playing" of these games, all of the insert pieces may be dumped in a pile within reach of the "players" surrounding the board. The individual player may either select an insert piece and proceed to establish a location where it may be properly placed, or he may select a particular opening representing the intersection of a column and a row, and then proceed to look through the pile for an appropriate insert piece indicia corresponding to the opening he has selected. A variety of rules may easily be established concerning the operation of the game, depending upon the aspect of the mathematical operations that the teacher wishes to emphasize. To whatever degree may be desired, the element of competition may also be applied, as by distributing the various insert pieces equally among the students, with instructions to see who can first complete the insertion of all that he has.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. An educational game device based on arithmetic calculations, said device comprising:
   a panel having a group of openings arranged in aligned rows and columns; and
   a plurality of insert pieces adapted for placement within said openings in closely-fitting relationship, said rows, columns, and insert pieces carrying on one side of said panel and insert pieces related indicia whereby the indicia on said insert pieces correspond with the result of the interaction of the indicia at the column and row at a particular one of said openings according to a particular arithmetic operation,
      each of said insert pieces having discontinuities interengageable with discontinuities in said panel at each of said openings representing the columns and rows which the indicia thereof produce the indicia on said insert piece, and none other, according to said operation,
      said panel and insert pieces carrying on the reverse side thereof indicia corresponding to the arithmetic operation opposite to that appearing on the side first referred to.

2. An educational game device based on arithmetic calculations, said device comprising:
   a panel having a group of openings arranged in aligned rows and columns; and
   a plurality of insert pieces adapted for placement within said openings in closely-fitting relationship, said rows, columns, and insert pieces carrying related indicia whereby the indicia on said insert pieces correspond with the result of the interaction of the indicia at the column and row at a particular one of said openings according to a particular arithmetic operation,
      each of said insert pieces having discontinuities interengageable with discontinuities in said panel at each of said openings representing the columns and rows which the indicia thereof produce the indicia on said insert piece, and none other, according to said operation.

3. An educational game device based on arithmetic calculations, said device comprising:
   a panel having a group of openings arranged in aligned rows and columns; and
   at least one insert piece adapted for placement within said openings, said rows, columns, and insert piece carrying related indicia whereby the indicia on said insert piece corresponds with the result of the interaction of the indicia at the column and row at a particular one of said openings according to a particular arithmetic operation,
      said insert piece having at least one discontinuity interengageable with a discontinuity in said panel at each of said openings representing the columns and rows which the indicia thereof produce the indicia on said insert piece, and none other, according to said operation.

References Cited by the Examiner
UNITED STATES PATENTS

| | | | |
|---|---|---|---|
| 1,624,450 | 4/1927 | Verschbinsky | 35—31.4 |
| 1,735,456 | 11/1929 | Garman | 35—71 |

FOREIGN PATENTS 9,816  6/1898  Great Britain.

EUGENE R. CAPOZIO, *Primary Examiner.*

LAWRENCE CHARLES, *Examiner.*